A. T. BALDWIN & S. L. CHRISTENSON.
AIR SPEED INDICATOR FOR AEROPLANES.
APPLICATION FILED JAN. 2, 1918
1,290,875.
Patented Jan. 14, 1919.
2 SHEETS—SHEET 1.
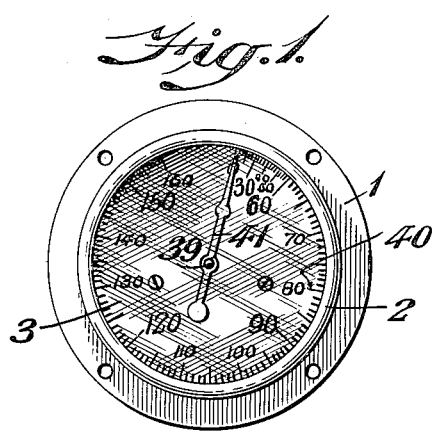
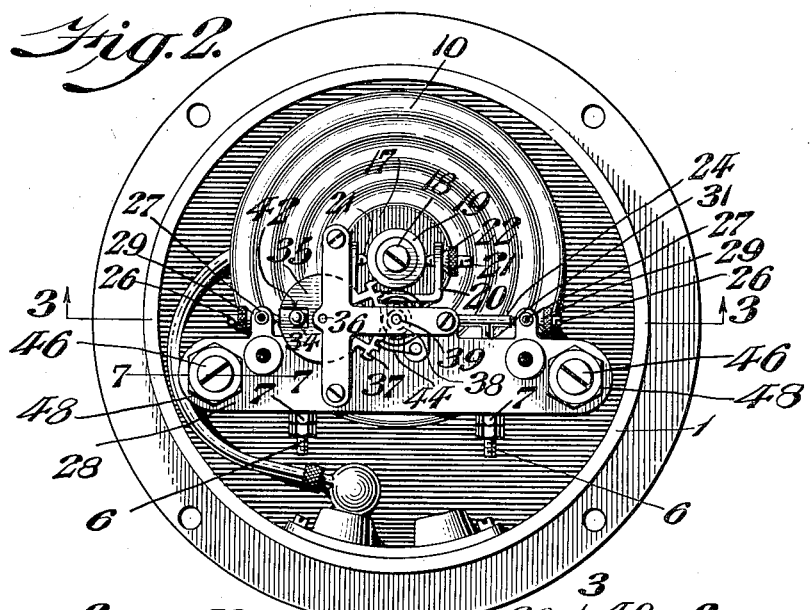
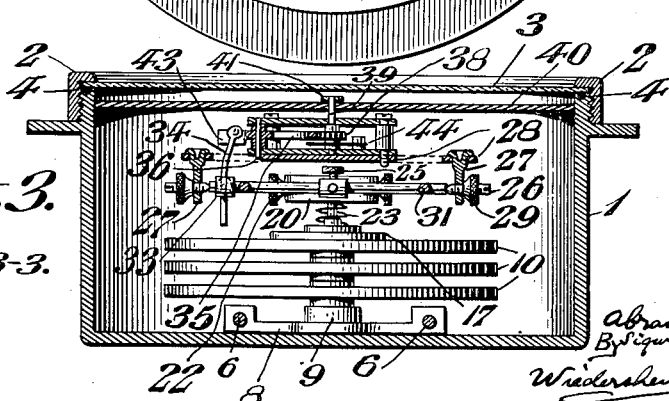
ON LINE 3-3.
FIG. 2.
INVENTORS
Abram T. Baldwin
By Sigurd L. Christenson
Wiedersheim & Fairbanks
ATTORNEYS

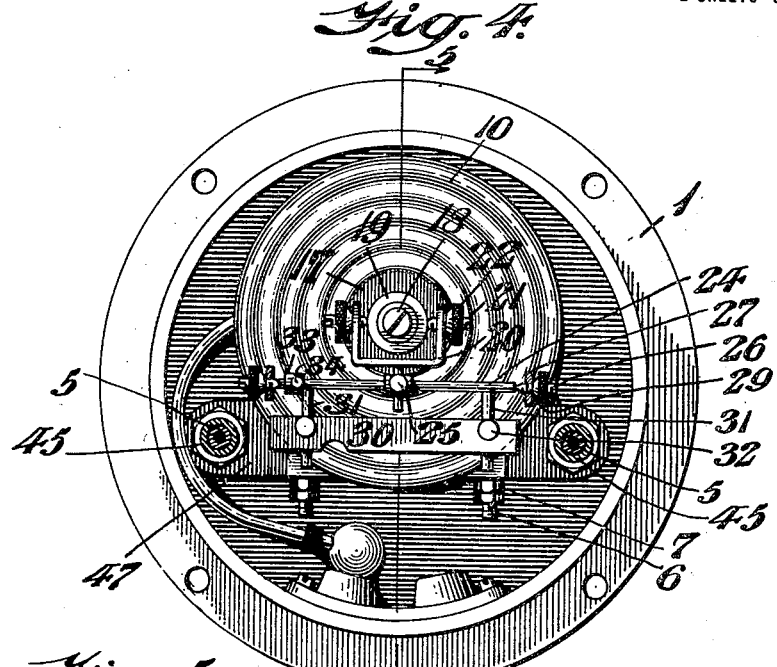
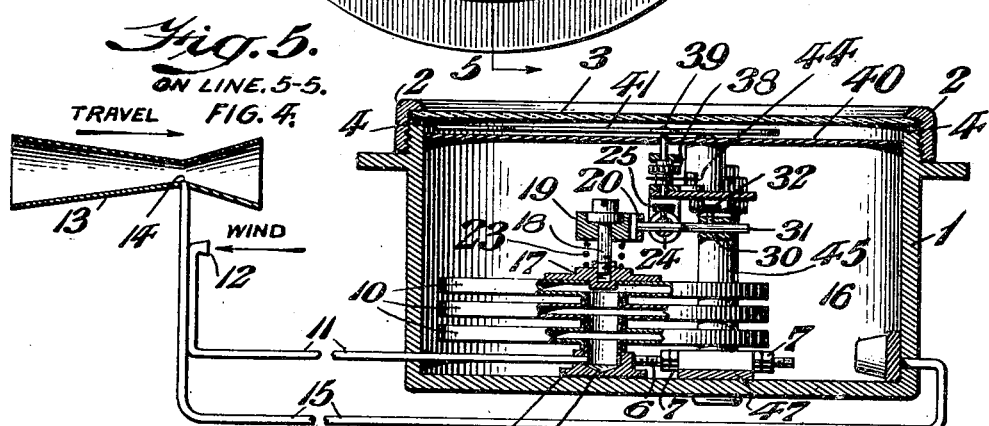
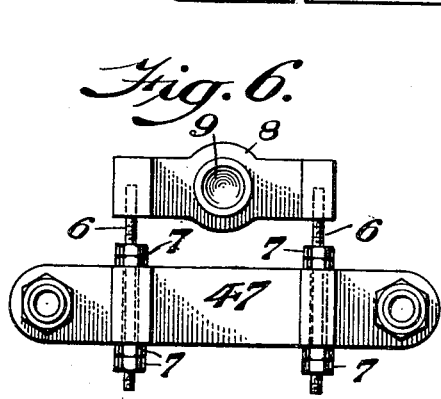
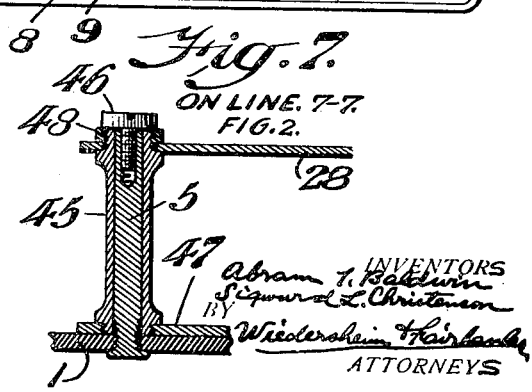

UNITED STATES PATENT OFFICE.

ABRAM T. BALDWIN AND SIGWURD L. CHRISTENSON, OF DETROIT, MICHIGAN.

AIR-SPEED INDICATOR FOR AEROPLANES.

1,290,875.   Specification of Letters Patent.   Patented Jan. 14, 1919.

Application filed January 2, 1918. Serial No. 209,829.

*To all whom it may concern:*

Be it known that we, ABRAM T. BALDWIN and SIGWURD L. CHRISTENSON, both citizens of the United States, residing at Detroit, in the county of Wayne, State of Michigan, have invented a new and useful Air-Speed Indicator for Aeroplanes, of which the following is a specification.

Our present invention consists of a novel construction of a speedometer which although especially designed for use with aeroplanes is not limited to such use but may be employed in conjunction with rapidly moving objects or devices.

In accordance with our invention, a vacuum is produced by the flow of air through a Venturi tube. Such flow of air is caused by the speed through the air of an aeroplane, which carries the speedometer. The vacuum produced at the small diameter of the tube is transmitted to an airtight case and assists in actuating a diaphragm, one side of which is subjected to such vacuum, while its opposite side is subjected to the pressure produced on a Pitot head forming a part of but separate from the Venturi tube. The vacuum from the Venturi tube and the pressure from the Pitot head are independent of each other and are combined simply for mechanical reasons and also to the end that the comparative pressures will be obtained from the same point on the aeroplane. The Pitot head faces toward the direction in which the machine travels and therefore receives the impact head due to the speed of the aeroplane, and the wind pressures against it. The resultant differential pressures to which the diaphragm is subjected causes the diaphragm to move and such motion is converted in a novel manner to a circular motion of a pointer which indicates in miles per hour the speed at which the aeroplane is traveling. The curve of vacuum and pressure on which the design of the instrument is based is that obtained for a small diameter of a Venturi tube of any suitable diameter.

With the above in view, our invention, in its broad and generic scope, consists of a novel speedometer for aeroplanes wherein a movable element is acted upon by different pressures and the movement of such diaphragm is communicated by novel means to a pointer which coöperates with a novel dial to indicate the miles per hour the aeroplane is traveling.

Other novel features of construction and advantage will hereinafter more clearly appear in the detailed description of our invention.

For the purpose of illustrating our invention, we have shown in the accompanying drawings a typical embodiment of it which is at present preferred by us, since this embodiment will give in practice satisfactory and reliable results, although it is to be understood that the various instrumentalities of which our invention consists can be variously arranged and organized and that our invention is not limited to the precise arrangement and organization of these instrumentalities as herein shown and described.

Figure 1 represents a top plan view of an air speed indicator embodying our invention.

Fig. 2 represents a top plan view with the dial removed.

Fig. 3 represents a section on line 3—3 of Fig. 2.

Fig. 4 represents a top plan view with the dial and certain parts removed.

Fig. 5 represents a section on line 5—5 of Fig. 4.

Fig. 6 represents a top plan view of a portion of the mechanism in detached position.

Fig. 7 represents a section on line 7—7 of Fig. 2.

Similar numerals of reference indicate corresponding parts.

Referring to the drawings:—

1 designates the case which is air tight when assembled and is preferably made of aluminum or aluminum alloy and may be either ordinary cast aluminum or a die casting and has a narrow bezel 2 for holding a bezel glass 3 against a rubber gasket 4. 1 has a bottom wall through which extend two support posts 5 for holding the movement. The two support posts 5 pass through the two hollow bridge columns 45 and receive the fastening screws 46 which screws 46 are threaded into the tops of the support posts, thereby fastening the movement to the case 1.

6 designates screws laterally adjustable in the bottom bridge plate 47 and provided with nuts 7, certain of which serve as lock nuts. These screws 6 are fixed to a diaphragm base 8 having a tubular seat 9 to receive the diaphragm or movable element 10. The diaphragm base 8 has its seat 9 in communication with the tube 11 which passes through the casing and is connected to the Pitot head 12 which is attached to the venturi 13. The vacuum port 14 of the latter communicates by means of a tube 15 with the chamber 16 of the casing. The diaphragm 10 consists of a plurality of folds and, as illustrated, consists of three so that the resultant movement of the diaphragm is three times as great as it would be if only one fold were employed. The upper fold of the diaphragm has fixed in it a plate 17 which is adapted to receive an adjusting screw 18. This permits a slight variation in the height of the diaphragm. This adjusting screw 18 passes with sliding fit through a swivel yoke 19 and is held on a swivel post 20 by means of pivot screw 21 and pivot nuts 22 so that the swivel yoke has a slight rotary movement on the axis of bearings. A spring 23 is disposed between the diaphragm and the swivel yoke. The swivel post 20 passes through a horizontal main shaft 24 and is fixed with respect to said shaft by a set screw 25. The shaft 24 is journaled on two adjustable pointed screw heads 26 carried by the ears 27 of a plate 28 and held in place by lock nuts 29.

The object of the lever and the devices just explained is to convert the vertical motion of the diaphragm into a rotary motion of the shaft 24. The diaphragm is balanced by a counterweight 30 positioned on two pins 31 fixed to the shaft 24 and running in an opposite direction from the adjustable swivel yoke connecting the shaft with the diaphragm. This weight 30 is fixed in position by screws 32 and is capable of adjustment on the pins 31.

The shaft 24 is provided at one end with a hub 33 fixed to it and adapted to receive an adjustable pin or lever 34 extending at right angles to the lever actuating the shaft and diaphragm. This vertical lever 34 is bent at a slight angle above the point where it has a straight shaft and passes through the hub 33, thus rendering it possible to change its length relatively to the shaft and also the length of the lever arm from the top of the shaft, which at such point has the contour of a ball, to the center of a segment 35 which this lever actuates. This segment 35 is mounted on a pin 36 so as to move in a horizontal plane. By this movement, the rotary action of the main shaft is converted to a horizontal rotary action of the segment and this motion of the segment can be proportioned by the adjustment of the vertical lever arm rising from the main shaft. The leverage of this small arm can be changed by rotating it within the hub on the main shaft. The segment 35 is balanced within itself and is designed to remain at any point at which it is placed and at any angle through the segmental gear 37 which meshes with a pinion 38 on a vertical shaft 39 carrying a pointer 41, which indicates the miles per hour on the dial. The segment is slotted as at 42, and one face of this slot is provided with a removable plate 43, highly polished to decrease the friction of the ball sliding on the removable plate.

By this mechanism is provided a very open scale on the calibrated dial 40 at the six important points, namely, zero, 30, 60, 90, 120, and 150 miles per hour.

The pinion has connected with it one end of a spring 44, the other end of which is connected to a fixed point so that the action of said spring tends to return the pointer to its initial or starting position and maintain a constant relation between the moving parts.

It will be understood that the posts 5 through the column 45 separate the upper bridge 28 and the lower bridge 47, the upper bridge being held on the columns 45 by nuts 48.

The privot shaft 24 is journaled in the brackets 27 which are connected with the upper bridge 28 in any desired manner.

It will be apparent from the foregoing that in accordance with our present invention, we subject a movable element, such as a diaphragm or its equivalent, to variable pressures, one side of the movable element being subjected to a pressure greater than atmospheric and the other side to a pressure less than atmospheric or a vacuum.

In the embodiment illustrated, we employ a venturi to produce a vacuum and a Pitot head to produce a pressure. The movable element is connected with a pointer or indicator by means of a relay so that there will be visibly indicated the amount of movement which has been imparted to the movable element and the speed will be indicated in miles per hours. The relay consists of the parts 18, 19, 20, 24, 33, 34, 35, 38, 39 and their adjuncts. The supporting columns 45 are preferably screwed into the lower bridge piece and the posts 5 are preferably screwed into the bottom of the casing and have their lower ends swaged.

It will be apparent that in accordance with our present invention provision is made to adjust the mechanism to meet any conditions or requirements met with in practice.

It will now be apparent that we have devised a novel and useful air speed indicator for aeroplanes, which embodies the features of advantage enumerated as desirable in the statement of the invention and the above description, and while we have, in the present instance, shown and described a typical embodiment of it which will give in practice satisfactory and reliable results, it is to be understood that this embodiment is susceptible of modification in various particulars without departing from the spirit or scope of the invention or sacrificing any of its advantages.

Having thus described our invention, what we claim as new and desire to secure by Letters Patent, is:—

1. In an air speed indicator, a movable element adapted to be subjected on opposite sides to different pressures, means to laterally adjust the position of said element and an indicating element movable in a plane at right angles to the plane of movement of said movable element and connected with it.

2. In an air speed indicator, a movable element adapted to be subjected on opposite sides to different pressures, a main shaft rocked by said element, an adjustable counterweight for said main shaft, a gear segment operatively connected with said main shaft, a pinion meshing with said gear segment, a pointer actuated by said pinion, and a tension device connected to said pinion.

3. In an air speed indicator, a movable element, adapted to be subjected on opposite sides to different pressures, a yoke actuated by said element, a shaft rocked by said yoke, an arm actuated by said shaft, a gear segment oscillated by said arm, a pinion actuated by said gear segment, and means controlled by said pinion, to visibly indicate the speed at which the indicator is moved.

4. In an air speed indicator, a plurality of diaphrams adapted to be subjected on opposite sides to different pressures, means to laterally adjust the position of said diaphragms, a rock shaft actuated by said diaphragms, a gear segment operatively connected to said shaft, and means controlled by said gear segment to visibly indicate the speed at which the indicator is being moved.

5. In an air speed indicator, an airtight casing, a diaphragm within said casing adapted to be subjected on opposite sides to different pressures, a yoke operatively connected with said diaphragm and rocked thereby, a shaft actuated by said yoke, a lever adjustably connected with said shaft, a gear segment rocked by said lever, and indicating mechanism controlled by said gear segment.

6. In an air speed indicator, an airtight casing, a diaphragm therein having a plurality of folds, said diaphragm being adapted to be subjected on opposite sides to different pressures, a shaft rocked by said diaphragm, a lever adjustably carried by said shaft, and indicating mechanism operatively connected with said lever.

7. In an air speed indicator, an airtight casing, a movable element therein subjected on opposite sides to different pressures, tubular supporting columns secured within said casing, bridge pieces connected with said supporting columns, a relay carried by said bridge pieces and operatively connected with said movable element, and indicating mechanism controlled by said relay.

8. In an air speed indicator, an airtight casing, a movable element therein subjected on opposite sides to different pressures, a shaft rocked by said movable element, a lever adjustably carried by said shaft and having a rounded end, a gear segment having a slot against one wall of which said rounded end of said lever bears, and speed indicating mechanism operatively connected with said gear segment.

9. In an air speed indicator, an airtight casing, a diaphragm base within said casing, means to laterally adjust said base, a diaphragm carried by said base, and adapted to be subjected on its opposite sides to different pressures, a lever rocked by said diaphragm, and indicating mechanism mounted to move in a plane at substantially right angles to the plane of movement of said diaphragm, said indicating mechanism being operatively connected with said lever.

10. In an air speed indicator, an airtight casing, a diaphragm therein adapted to be subjected on opposite sides to different pressures, a shaft operatively connected with said diaphragm to be rocked thereby, a lever adjustably connected with said shaft, and indicating mechanism actuated by said lever.

11. In an air speed indicator, an airtight casing, a diaphragm therein adapted to be subjected on opposite sides to different pressures, a screw adjustably connected with said diaphragm, a swiveled yoke loosely mounted on said screw, a spring between said yoke and diaphragm, a shaft connected with said yoke to be rocked by it, a lever adjustably connected with said shaft, and indicating mechanism actuated by said lever.

12. In an air speed indicator, a casing, a diaphragm therein dividing the casing into two chambers, means to lead differential pressures to said chambers, an adjusting screw carried by said diaphragm, a yoke swiveled on said adjusting screw, a spring between said diaphragm and said yoke, a main shaft rocked by said yoke, an adjustable counterbalance for said shaft, a vertical arm bent at an angle and connected to said shaft, a segment mounted to move in a substantially horizontal plane and actuated by said shaft, a vertically disposed shaft, a pinion on said shaft meshing with said segment, a pointer mounted on said vertical shaft to move in a substantially horizontal plane, and a dial with which said pointer coöperates.

ABRAM T. BALDWIN.
SIGMUND L. CHRISTENSON.

Witnesses:
ROBERT H. MERRIAM,
CATHERINE PALFRAY BALDWIN.